United States Patent Office 2,760,605
Patented Aug. 28, 1956

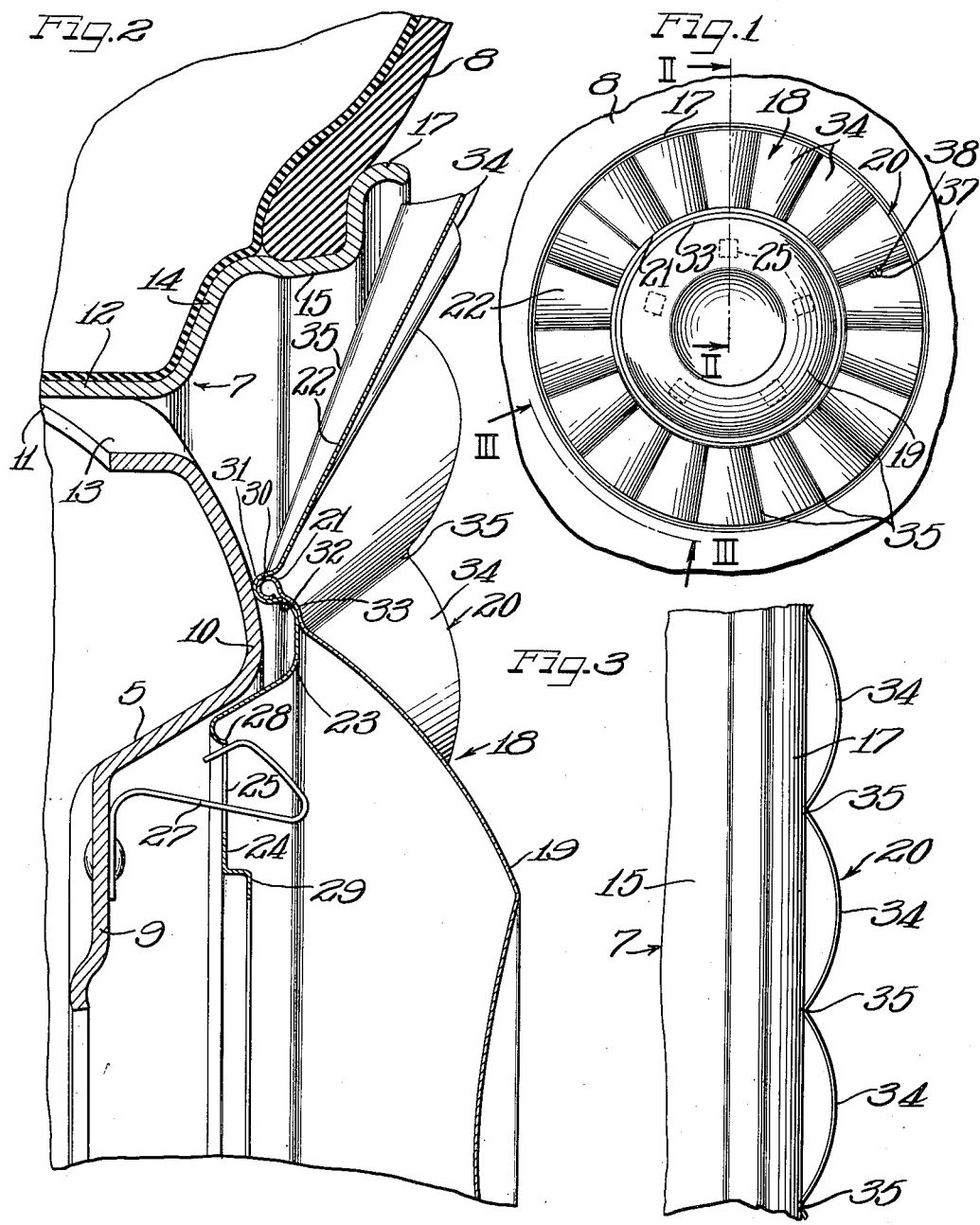

2,760,605

WHEEL STRUCTURE

George Albert Lyon, Detroit, Mich.

Application July 17, 1951, Serial No. 237,151

7 Claims. (Cl. 188—264)

The present invention relates to improvements in wheel structures and more particularly concerns a novel arrangement for covering the outer side of vehicle wheels.

An important object of the present invention is to provide an improved wheel structure comprising novel means for ornamentally and protectively covering the outer side of a wheel.

Another object of the invention is to provide an improved wheel cover.

A further object of the invention is to provide a composite wheel cover structure.

Still another object of the invention is to provide an improved wheel cover which affords circulation of air to the inside of the wheel.

According to the general features of the present invention there is provided in a wheel structure including a tire rim and a wheel body with ventilation openings through the wheel body adjacent to the tire rim, a cover for the outer side of the wheel including means for attaching the cover to the wheel and a radially outer annular cover portion having a series of radially extending air deflectors defining air entry openings at the outer periphery of the cover and between said outer periphery and the tire rim.

According to another feature of the invention a wheel cover is provided including means therebehind for attachment to a wheel and an outer annular cover portion having a plurality of generally radially extending air deflecting portions.

Another feature of the invention resides in the provision of a wheel cover including an annular trim member having a radially outwardly extending wheel covering portion and a radially inwardly extending portion for engagement by means to retain the cover on the wheel, and a central circular cover portion having a beaded margin, the annular cover member having an intermediate annular groove within which the beaded margin is interengaged.

Other objects, features and advantages of the present invention will be readily apparent from the following detailed description of a preferred embodiment taken in conjunction with the accompanying drawings, in which:

Figure 1 is a fragmentary outer side view of a vehicle wheel showing the cover of the present invention applied thereto;

Figure 2 is an enlarged radial sectional view taken substantially on the line II—II of Fig. 1; and Figure 3 is a fragmentary edge elevational view of the wheel and cover of substantially that portion of the wheel structure indicated by the line III—III in Fig. 1, but on an enlarged scale.

As shown on the drawings:

A vehicle wheel comprising a wheel body 5 and a tire rim 7 is adapted to support a pneumatic tire and tube assembly 8. Both the wheel body 5 and the tire rim 7 may be appropriately stamped or rolled from suitable gauge sheet metal.

The wheel body is of the disk type having a central bolt-on flange 9, an intermediate annular outwardly projecting reinforcing nose bulge 10 and an annular axially inwardly extending outer marginal flange 11 which is attached in any suitable manner to a base flange 12 of the tire rim. At suitable intervals, the attachment flange 11 of the wheel body is inset to provide suitable wheel openings 13 through which brake-drum-cooling air can circulate from the front of the wheel through the back.

The tire rim includes a side flange 14 extending generally radially outwardly, an intermediate generally axially outwardly extending flange 15 and a terminal flange 17. It will be observed from Fig. 2 that the flanges of the tire rim and the nose bulge 10 of the wheel body define therebetween an annular groove of substantial depth communicating with the wheel openings 13.

According to the present invention a wheel cover 18 is mounted at the outer side of the wheel. This cover preferably comprises a central circular cover member 19 and an outer generally circular cover member 20 assembled together and substantially entirely covering the wheel.

The central circular cover member 19 comprises a crowned body having a preferably underturned beaded annular margin 21 of a diameter to engage over the nose bulge 10 of the wheel body.

The outer cover member 20 is preferably of a magnitude and extent to concealingly overlie the outer side of the tire rim 7 and includes means for supporting the inner circular cover member 19. To this end, the outer cover member 20 comprises a radially outer annular portion 22 which is of a width to extend from substantially concealing relation to the tire rim 7 to the marginal bead 21 of the inner cover member. Radially inwardly from the juncture of the outer portion 22 with the beaded edge of the cover member 19, the cover member 20 comprises a generally radially inwardly extending portion 23 which may be formed to clear the nose bulge 10 and extends generally radially and axially inwardly and then radially inwardly to provide an attachment central portion or flange 24 having clip-receiving apertures 25 therein through which extend retaining spring clips 27 mounted on the bolt-on flange 9 of the wheel body. At the radially outer side of the clips 25 the attachment flange portion 24 is formed with a reinforcing rib 28 to resist deformation from the retaining engagement of the clips 27. At the radially inner margin, the retaining portion 24 is preferably provided with a generally L-shaped angular reinforcing flange structure 29.

For interconnecting the cover members 19 and 20, the beaded edge 21 of the inner circular cover member 19 is retained in a retaining annular groove 30 provided at the juncture of the outer cover portions 22 and 23 and at the inside of the cover defining an axially inwardly projecting annular rib 31 which seats against the nose bulge 10 of the wheel body. A substantially interlocking relation of the inner cover bead 21 within the groove 30 is attained by a radially outwardly spun or crimped retaining shoulder 32 formed on the cover member portion 23 at the inside of the bead 21 and retainingly interengaging therewith to retain the bead in the groove 30. To accommodate the annular shouldered portion 32, the outer cover member 19 may be formed with an annular rib 33 immediately adjacent the bead 21 and providing a generally radially inwardly opening groove into which the shoulder 32 nestingly engages to maintain the interlocked relationship of the cover members. Through this arrangement, the cover members 19 and 20 can be made separately and assembled. The cover members may be made from the same material or from different grades or gauges or material. The cover members may, in addition, be provided with any desired external finish, either contrasting or similar, as desired. For example, the inner cover member may be provided with a lustrous polished finish while the outer cover member 20 may be provided with a white or colored finish. On the other hand the cover member 20 may be lustrously polished while the inner cover member 19 may be given a contrasting finish.

In applying the cover to a wheel the cover is placed in relation to the wheel so that the clips 27 engage through the appropriate apertures provided in the cover, which may be any desired number such as three or five, and the cover is then pressed axially inwardly into retained relation on the wheel, wherein the clips engage against the shoulder 28 at the radially outer sides of the openings 25 and the rib 31 of the cover engages against the wheel body nose portion 10.

To remove the cover, a pry-off tool may be engaged between the outer margin of the cover member 20 which serves as a covering trim for the wheel and leverage applied to strain the cover free from the resilient clips 27.

It is desirable not only to afford for circulation of brake drum cooling air through the wheel, but it is desirable to promote such circulation. To this end the present cover is constructed to afford a spaced relation between the outer cover member 20, and more especially the radially outer margin thereof and the tire rim at the terminal flange 17 of the tire rim. This is accomplished by having the cover portion 22 of the outer cover member 20 extend radially and axially outwardly from the seating bead 31 in spaced relation to the tire rim not only at the rear of the cover portion 22 but also at its edge which extends in a spaced relation to the extremity of the terminal flange 17 of the tire rim.

In addition, the radially outer cover portion 22 is formed with air scooping and circulation promoting vane-scoops 34. These vane scoops are of generally scallop-like appearance defined by generally radially extending axially inwardly projecting ribs 35. Each of the vane-scoops 34 is of tapering width and convex concave cross section, bowed outwardly and providing relatively wide scoop mouths at the outer perimeter of the cover. As best seen in Figs. 2 and 3, the outer ends or mouths of the vane-scoops 34 project axially outwardly substantially beyond the tip of the terminal flange 17 of the tire rim while the intermediate ribs 35 extend at their outer ends adjacent to the terminal flange tip. Through this arrangement, as the wheel turns in service, air is scooped in by the vane-scoops 34 and circulates inwardly through the annular groove between the tire rim and the wheel body nose bulge 10 and into the wheel openings 13 for cooling circulation past the brake drum of the vehicle with which the wheel may be used. By having the vane-scoops 34 symmetrically formed, the cover may be used either on a left or a right side wheel with equal effect.

A valve stem aperture 37 may be provided in the outer cover member portion 22 for projection therethrough of a valve stem 38 (Fig. 1).

It will be understood that modifications and variations may be effected without departing from the scope of the novel concepts of the present invention.

I claim as my invention:

1. In a wheel structure including a tire rim and a wheel body with ventilation openings through the wheel body adjacent to the tire rim, a cover for the outer side of the wheel including means for attaching the cover to the wheel and a radially outer annular cover portion having an annular uniformly spaced series of generally radially extending scallop-like air deflectors defining air entry openings at the outer periphery of the cover and between said outer periphery and the tire rim.

2. A wheel cover including an annular trim member having a generally radially outwardly extending wheel covering portion and a generally radially inwardly extending portion for engagement by means to retain the cover on the wheel, and a central circular cover portion having a beaded margin, the annular trim member having an intermediate annular groove within which the beaded margin is interengaged, and the wheel cover portion having an annular undulating margin including broad axially outer air scoop ribs and narrow axially inner reinforcing ribs.

3. In a wheel structure including a tire rim and a load sustaining body part, a cover comprising as a unit a portion seating on the body part and a radially outwardly extending annular portion in substantially concealing spaced relation to the tire rim, said radially extending portion of the cover having thereon an annular connected series of generally radially extending ribs and scallop-like air circulation promoting undulations tapering from said wheel engaging portion of the cover to maximum width at the outer edge of the radially extending portion of the cover.

4. A cover assembly for disposition at the outer side of a vehicle wheel, comprising a circular cover member having an annular outwardly opening groove therein, a second circular cover member having a margin provided with a bead nesting in said groove, an annular groove in said second cover member adjacent to said bead, and a shoulder on said first mentioned cover member interlockingly engaging in said groove in the second cover member.

5. In a wheel structure including a multi-flanged tire rim and a load supporting body having an annular nose bulge with air circulation openings between the wheel body and the tire rim, a cover for substantially concealing the outer side of the wheel comprising a central circular cover portion having a beaded margin, and an annular trim member having an annular axially inwardly protruding rib for seating against said nose bulge and defining an axially outwardly opening intermediate annular groove within which the beaded margin is interengaged, said trim member having means radially inwardly of said rib for retaining the trim member with the wheel and having means radially outwardly of said rib defining generally radially outwardly opening scallop-like air scoops for promoting circulation of air through the air circulation openings of the wheel.

6. In a wheel structure including a multi-flanged tire rim and a load-supporting body having an annular nose bulge with air circulation openings between the wheel body and the tire rim, a cover for substantially concealing the outer side of the wheel comprising a central circular cover portion having a beaded margin, an annular trim member having an annular axially inwardly protruding rib for seating against said nose bulge and defining an axially outwardly opening annular groove within which the beaded margin is interengaged, and means for attaching the cover to the wheel, said trim member having means radially outwardly of said rib including axially inwardly projecting generally radially extending reinforcing ribs and curved generally axially outwardly projecting generally radially extending air scoop ribs providing air circulation channels on the inner side of the trim member leading from the outer margin of the trim member generally inwardly and arranged for promoting circulation of air through the air circulation openings of the wheel in the running of the wheel.

7. The structure of claim 1 further characterized by the annular cover portion having its radially inner margin reinforced and provided with cover retaining means for detachable engagement with the wheel.

References Cited in the file of this patent
UNITED STATES PATENTS

| | | |
|---|---|---|
| 2,096,971 | Lyon | Oct. 26, 1937 |
| 2,106,702 | Campbell | Feb. 1, 1938 |
| 2,143,950 | Kliesrath | Jan. 17, 1939 |
| 2,175,044 | Van Halteren | Oct. 3, 1939 |

(Other references on following page)

UNITED STATES PATENTS

| | | |
|---|---|---|
| 2,190,669 | Lyon | Feb. 20, 1940 |
| 2,308,618 | Lyon | Jan. 19, 1943 |
| 2,312,159 | Gulotta | Feb. 23, 1943 |
| 2,386,225 | Lyon | Oct. 9, 1945 |
| 2,401,492 | Lyon | June 4, 1946 |
| 2,441,008 | Chase | May 4, 1948 |
| 2,484,533 | Sinclair | Oct. 11, 1949 |
| 2,491,506 | Lyon | Dec. 20, 1949 |
| 2,639,948 | Grimshaw | May 26, 1953 |

OTHER REFERENCES

"Chrysler Brake Service," page 14, May 1951.